Figure 1:
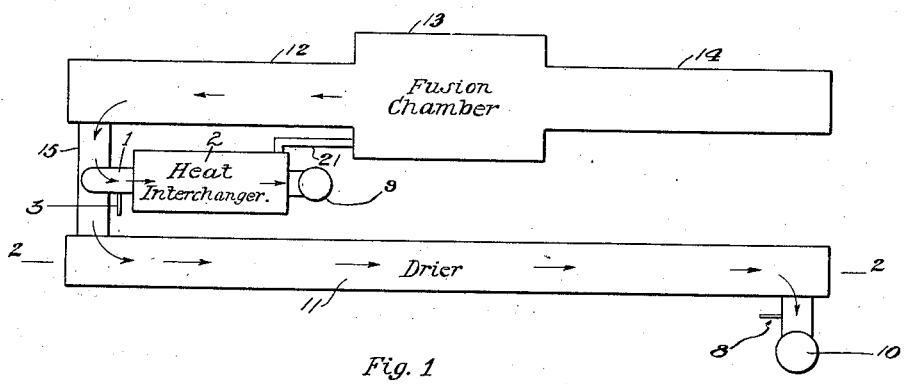

June 9, 1931.  B. M. JOHNSON  1,809,628
MEANS FOR UTILIZING THE WASTE GASES FROM FURNACES
Filed Aug. 13, 1928  2 Sheets-Sheet 1

INVENTOR.
Boyd M. Johnson
BY
ATTORNEYS.

June 9, 1931. B. M. JOHNSON 1,809,628
MEANS FOR UTILIZING THE WASTE GASES FROM FURNACES
Filed Aug. 13, 1928 2 Sheets-Sheet 2

INVENTOR.
Boyd M. Johnson
BY
ATTORNEYS.

Patented June 9, 1931

1,809,628

UNITED STATES PATENT OFFICE

BOYD MILO JOHNSON, OF METUCHEN, NEW JERSEY, ASSIGNOR TO THE CARBORUNDUM COMPANY, OF NIAGARA FALLS, NEW YORK, A CORPORATION OF PENNSYLVANIA

MEANS FOR UTILIZING THE WASTE GASES FROM FURNACES

Application filed August 13, 1928. Serial No. 299,428.

This invention relates to improvements in the utilization of waste heat from furnace gases, and relates particularly to the utilization of waste gases from furnaces used in the successive heat treatments of articles of manufacture. The invention is especially applicable to heating furnaces and drying chambers in which, as in porcelain enameling, the articles to be heated are subjected to more or less prolonged drying, then gradually heated to the temperature which they will experience in what may be called the fusion chamber, and (after the intensive heating of the fusion chamber) gradually cooled to a temperature at which they may be taken into the outside atmosphere permanently or temporarily.

An arrangement of this sort is described in copending U. S. application, Serial No. 264,169, filed March 23, 1928. It includes a long drying chamber arranged in parallel with a furnace for successive heat treatments in the order referred to above. The articles under treatment are carried successively through the drying chamber and the successive stages of the furnace by means of overhead conveyors situated outside the furnace and drying chamber, special means being used to prevent leakage of hot gases through the roof of the drying chamber and through the roof of the furnace. This is necessary because the rods which are supported from the travelling conveyor and which in turn support the ware must pass through a slot in the roof. I do not limit my invention however, to furnaces using the above means for transporting the ware. The ware may be moved through the drying chamber and the furnace in cars running on tracks within the drying chamber and furnace respectively, and outside between the two. In either case the ware will be moved first through the drying chamber and then into a furnace which may have, for example, three zones. In the first zone the temperature gradually increases from the point of entry to the fusion chamber. This temperature gradient may be maintained by drawing waste gases from combustion units located adjacent the central chamber through the preheating chamber or through a duct adjacent to the latter. In the middle zone the temperature is maintained sufficiently high to fuse enamel or otherwise mature the article under manufacture. In the third zone (from the fusion chamber to the point of discharge) the temperature gradually decreases to or nearly to the outside atmospheric temperature. This may be accomplished by leading outside air in through the cooling chamber or through a duct adjacent to it.

The waste combustion gases contain more heat than is required to maintain the drying chamber at a suitable temperature. My problem therefore has been to devise means for regulating the amount of combustion gases used to heat the drying chamber, to dispose of the remainder of these gases in a useful and economical manner, and to protect the ware in the drying chamber from contamination by the waste gases while efficiently transmitting to the ware the portion of heat required from these gases.

Figure 3:
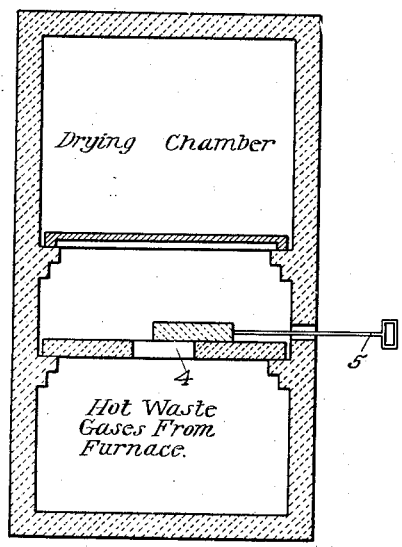
Figure 2:
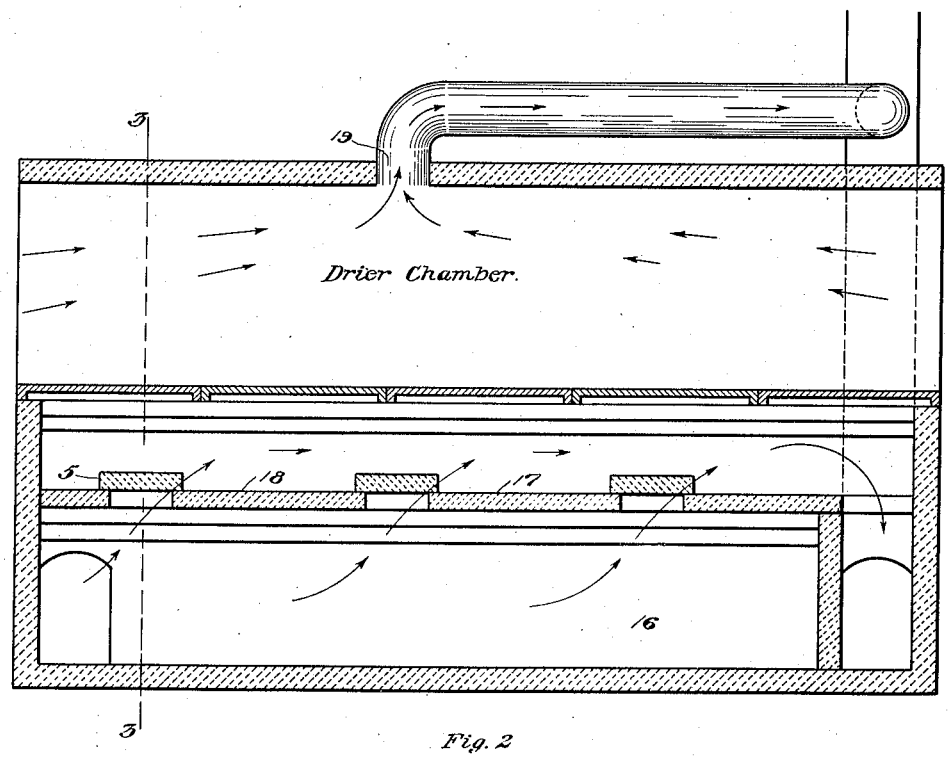

Means to accomplish these various desirable objects is illustrated in the drawing, in which Figure 1 is a plan view showing the preliminary drying chamber connected near one end with the furnace, together with a bleeder for this connection in which is included a heat interchanger;

Figure 2 is a vertical section of the drying chamber on the line 2—2 of Figure 1; and Figure 3 is a vertical section of the drying chamber on the line 3—3 of Figure 2.

The ware to be treated is first transported by means not shown, but of one of the types described above, through the drying chamber 11 and then outside or through an interconnecting chamber to the preheating zone (12) of the furnace. As the ware travels through the long zone 12, it is gradually warmed up to the temperature of the fusion chamber. Here the ware is matured. The heat may be supplied by means of combustion units placed in the sides of the fusion chamber. The ware is then gradually cooled in the long cooling chamber 14.

The waste gases from the combustion units are first drawn through the preheating zone 12 or through a duct adjacent to it and then into the interconnecting duct 15. There the gases divide, part passing into the drying chamber 11, and part into the duct 1 which leads to a heat interchanger 2. The combination (1, 2) may be termed a "bleeder" which regulates the proportion of the waste gases which pass through the drying chamber and through the heat interchanger respectively. The proportional flow is regulated by means of a damper 3 situated in the duct (1) and by a damper 8 at the opposite extremity of the drying chamber. This regulation may be assisted by means of blowers situated between the heat interchanger and the drying chamber and their respective stacks (9) and (10) respectively.

It is intended that the bleeder 1 shown in Figure 1 should take 90 to 50 percent of the waste gases which enter the cross passage way from the furnace. The quantity of waste gases passing through the heat interchanger 2 is regulated by means of the damper 3 shown in Figure 1.

The heat interchanger contains alternate passage ways for the waste gases and for atmospheric air with separating walls of some good conducting material which is substantially impervious to the waste gases and to the air. After passing through the interchanger the waste gases are led to the stack or flue, the circulation being assisted by fans where necessary. Any suitable pumps or fans may be used to promote the circulation of the waste gases and of the atmospheric air and these may be placed at such locations as may prove most effective. The heated air passes therefore to the combustion chambers of the furnace to promote the combustion of fuel there. This method will tend to give higher temperatures in the combustion chamber and to cause a saving in fuel, as compared with conditions where the air is not preheated. A portion of this hot air may be used to warm a separate drier or the building containing the articles.

The waste gases which do not pass into the heat interchanger are made to flow through the lowest compartment (16) of the drying chamber as shown in Figures 2 and 3. This compartment is separated from an intermediate compartment (17) by a clay partition (18) which is supported at the ends. It may also be supported in the middle by means of a vertical partition containing openings. There are openings 4 between the lowest compartment and the intermediate compartment whose size may be controlled by means of dampers 5. These may be adjusted manually as indicated in Figure 3. The intermediate compartment is separated from the upper compartment by means of an iron plate. The ware in the upper chamber is thus favorably situated to be warmed by the waste gases without contamination from them while in the drying chamber. An opening (19) is shown (in Figure 2) from the top of the upper chamber by means of which moisture and volatile products from the articles of manufacture may be removed by any suitable suction means.

The means for properly proportioning the available waste heat to that required for the drier and that used in the heat interchanger for preheating air for the combustion chamber or other use includes the dampers shown in Figure 1 and may also include various pumps or fans. These may be regulated by hand or automatically by thermostatic control.

The ends of the furnace and drier may be closed when the articles are not passing through the end openings by means of trap doors, and screens may be carried along with the articles which will retard the passage of air or gas through the ends of the furnace and drier.

The means described for closing the ends of the drying chamber containing the ware will evidently not close it sufficiently tightly to prevent air entering the ends to take the place of air and gases removed by the suction pipe shown at the top of Figure 2.

The respective means referred to in the last two paragraphs are auxiliary to the main purpose of my invention and are therefore not claimed. The drawings have been prepared with a view to illustrating the main invention.

A duct 21 is shown for carrying heated atmospheric air from the heat interchanger 2 to a combustion unit in or adjacent to the fusion chamber. The duct 21 may also supply air for warming the building.

It is believed that the methods of utilizing the waste gases according to my invention will be clear from the foregoing description and accompanying drawings. The economical use of these gases in a manner which will not injure the ware is a matter of considerable technical importance. The proper location of the bleeder, the heat interchanger and the means for regulating the flow of gases in the drying chamber are the main features of my invention.

I claim:

1. The combination with a kiln, of a drier, means for conducting waste combustion gases from the kiln to the drier, a heat exchanger, and means for deflecting some of the waste gases from the kiln to the heat exchanger, said means being variable whereby the amount of combustion gases necessary for the operation of the drier may be supplied the drier and the heat from the excess conserved without overheating the drier.

2. In an apparatus of the class described, a furnace, a drier, means for conducting gases of combustion from the furnace to the drier whereby the drier is heated by waste gases from the furnace, a heat exchanger, and means for directing some of the gases of combustion from the furnace directly to the heat exchanger whereby such portion of the waste gases as are required for the operation of the drier are transferred to the drier while the heat from the excess is conserved by the heat exchanger.

3. Apparatus of the class described comprising a furnace and a drier, means for conducting gases of combustion from the furnace to the drier, whereby the drier is heated by waste gases from the furnace, an air heater, variable means for deflecting some of the waste gases to the air heater, and means for conducting heated air from the air heater to the furnace to support combustion therein.

4. In an apparatus of the class described, a furnace, a drier, means for conducting gases of combustion from the furnace to the drier for warming the drier, adjustable means within the drier for varying the quantity of the gases made available for heating the drier, a heat exchanger, and adjustable means for deflecting some of the waste gases of combustion from the furnace to the heat exchanger whereby the major portion of the excess gases can be utilized in the heat exchanger and the remaining amount of the gases flowing to the drier adjusted to secure the desired temperature conditions within the drier.

5. In an apparatus of the class described, a furnace, a drier of the type adapted to be heated from waste gases of combustion, adjustable means in the drier for varying the amount of waste gases utilized in the drier, means for transferring waste gases of combustion from the furnace to the drier, a heat exchanger, means for conducting waste gases from the furnace to the heat exchanger, and adjustable means for dividing the flow of gases from the furnace between the heat exchanger and the drier.

6. An enameling apparatus comprising in combination, a continuous heating chamber and a drier, said heating chamber comprising in succession a preliminary heating zone, a combustion zone and a cooling zone, a duct connecting the entrance of the preliminary heating zone and one end of the drier for conveying hot gases therebetween, a bleeder for said duct which diverts part of the said hot gases from the drier, a heat interchanger with which the bleeder communicates for transferring excess heat from said diverted gases to atmospheric air, a duct from said heat interchanger to the combustion zone for carrying said heated atmospheric air to the combustion zone to support combustion therein, and means for proportioning the said hot gases between the drier chamber and the bleeder respectively.

7. In an enameling apparatus, an enameling furnace having a combustion zone with burners therein and a preliminary heating zone in advance of the combustion zone, a drier for the ware to be enameled, a passageway from the combustion zone to the preliminary heating zone through which gases of combustion are conducted from the combustion chamber and by means of which the preliminary heating chamber is heated, a passageway through which gases of combustion are carried after they have been utilized in the preliminary heating zone to the drier, a heat exchanger, and means for deflecting some of the gases of combustion from the drier to the heat exchanger.

8. In an enameling apparatus, an enameling furnace having a combustion zone with burners therein and a preliminary heating zone in advance of the combustion zone, a drier for the ware to be enameled, a passageway from the combustion zone to the preliminary heating zone through which gases of combustion are conducted from the combustion chamber and by means of which the preliminary heating chamber is heated, a passageway through which gases of combustion are carried after they have been utilized in the preliminary heating zone to the drier, a heat exchanger, means for deflecting some of the gases of combustion from the drier to the heat exchanger, an air heater, means in said passage for dividing the flow of combustion gases between the drier and the air heater, and means for conducting heated air from the heater to the burners in the combustion zone of the furnace.

9. In the art of porcelain enameling or the like wherein the ware is first dried and then burned, the method which comprises maintaining the burning temperature at a point sufficiently high to mature the enamel, conducting hot gases of combustion from the burning chamber, utilizing a portion only of said gases for heating the drier, and recovering the heat from the remaining body of said gases.

10. In the art of porcelain enameling wherein the ware is first dried, then given a preliminary heating, then fired, the method which comprises burning fuel in a furnace to fire the ware, conducting substantially all of the gases of combustion from the furnace through a structure in which the preliminary heating of the ware is effected whereby said structure is heated to a relatively high degree, thereafter dividing the flow of the gases of combustion between the drier and a heat exchanger and adjusting the flow of gases to the drier to approximately the amount required for the operation of the drier without overheating thereof.

11. In the operation of a porcelain enameling apparatus comprising a drier and a furnace having a preliminary heating chamber and a combustion chamber, the method which comprises burning fuel in the combustion chamber at a rate which insures maturing of the enamel, utilizing substantially all of the gases of combustion for heating the preliminary heating chamber, thereafter conducting some of the gases to the drier and some of the gases to a heat exchanger and adjusting the flow of the gases to the drier to approximately meet the needs of the drier, and further dividing the flow of gases in the drier to utilize some of them and by-pass the remainder, whereby an accurate control of temperature in the drier is secured without dilution of the gases of combustion with cold air and without substantial loss of available heat.

12. A drier for use in connection with an enameling furnace comprising a lower compartment through which hot gases from the furnace are adapted to be passed, an intermediate compartment above said lower compartment and separated from it by a partition of poorly conducting material, said partition having damper controlled openings therein, an upper compartment for holding ware to be treated and separated from the intermediate compartment by a metal partition.

13. A drier for use in connection with an enameling furnace comprising a lower compartment through which hot gases from the furnace are adapted to be passed, an intermediate compartment above said lower compartment and separated from it by a partition of poorly conducting material, said partition having damper controlled openings therein, an upper compartment for holding ware to be treated and separated from the intermediate compartment by a metal partition, and means for removing gases and vapors from said upper chamber.

14. A drier for use in connection with an enameling furnace or the like comprising a structure having a compartment in which the ware to be dried is contained, a substantially coextensive passageway along said compartment and separated from the compartment by a heat conducting partition, a second passageway substantially co-extensive with the first and damper controlled passages at intervals along the second passageway and communicating with the first, said second passageway being adapted to receive gases of combustion from an enameling furnace or the like.

15. In a drier for porcelain enameling or the like, a ware chamber adapted to contain the ware to be dried, an adjacent compartment for the passage of hot gases, and a third compartment substantially coextensive with the second and communicating with the second through a series of ports at least some of which are provided with dampers, said ware chamber being separated from the adjacent compartment by a heat conducting partition which is substantially impervious to gases.

16. In a furnace for porcelain enameling or the like, a heating furnace, a drying chamber, a passageway for waste gases between the furnace and the drying chamber, and adjustable means for directing a portion only of the waste gases from the furnace through the drying chamber whereby a portion of the heat from the waste gases is used to warm the drying chamber.

In testimony whereof I have hereunto set my hand.

BOYD MILO JOHNSON.